United States Patent
Yetukuri et al.

(10) Patent No.: US 11,110,820 B2
(45) Date of Patent: Sep. 7, 2021

(54) SEAT ADJUSTMENT LIMITER AND METHOD OF CONTROL

(71) Applicant: Lear Corporation, Southfield, MI (US)

(72) Inventors: Arjun Yetukuri, Rochester Hills, MI (US); Karl Henn, New Hudson, MI (US); Mark R. Keyser, Lake Orion, MI (US); Mladen Humer, West Bloomfield, MI (US); Mark Sparschu, Birmingham, MI (US)

(73) Assignee: LEAR CORPORATION, Southfield, MI (US)

( * ) Notice: Subject to any disclaimer, the term of this patent is extended or adjusted under 35 U.S.C. 154(b) by 406 days.

(21) Appl. No.: 15/944,402

(22) Filed: Apr. 3, 2018

(65) Prior Publication Data

US 2019/0299814 A1    Oct. 3, 2019

(51) Int. Cl.
*B60N 2/02*     (2006.01)
*B60N 2/06*     (2006.01)
*B60N 2/22*     (2006.01)

(52) U.S. Cl.
CPC ......... *B60N 2/0244* (2013.01); *B60N 2/0232* (2013.01); *B60N 2/06* (2013.01); *B60N 2/22* (2013.01); *B60N 2002/024* (2013.01); *B60N 2002/0268* (2013.01); *B60N 2002/0272* (2013.01)

(58) Field of Classification Search
CPC ...... B60N 2/22; B60N 2/0232; B60N 2/0244; B60N 2/06; B60N 2002/0268; B60N 2002/0272; B60N 2002/024
See application file for complete search history.

(56) References Cited

U.S. PATENT DOCUMENTS

| | | | |
|---|---|---|---|
| 4,852,934 A | * | 8/1989 | Yasuda ............... B60N 2/0232 296/64 |
| 5,812,399 A | | 9/1998 | Judic et al. |
| 5,882,060 A | | 3/1999 | Walk et al. |
| 7,669,909 B2 | | 3/2010 | Reinhardt et al. |
| 7,971,938 B2 | | 7/2011 | Wieclawski |

(Continued)

FOREIGN PATENT DOCUMENTS

| | | |
|---|---|---|
| CN | 101497320 A | 8/2009 |
| CN | 106143220 A | 11/2016 |

(Continued)

OTHER PUBLICATIONS

Office Action from German Application No. DE 102017200064.3; dated Jul. 19, 2017; 11 pages.

(Continued)

*Primary Examiner* — Ramsey Refai
(74) *Attorney, Agent, or Firm* — Brooks Kushman P.C.

(57) ABSTRACT

A vehicle seat controller is provided to control a front seat assembly and a rear seat assembly positioned directly behind of the front seat assembly. The vehicle seat controller programmed to receive a first input indicating whether the rear seat assembly is occupied and receive a second input indicating a position of the front seat assembly. The vehicle seat controller is programmed to provide a signal to an actuator to move the front seat assembly forward if the first input indicates the rear seat is occupied and the second input indicates the position exceeds a rearward travel threshold.

19 Claims, 2 Drawing Sheets

(56) References Cited

U.S. PATENT DOCUMENTS

| | | |
|---|---|---|
| 8,403,414 B2 | 3/2013 | Osaki |
| 8,444,224 B2 | 5/2013 | Maeda et al. |
| 8,616,654 B2 | 12/2013 | Zenk et al. |
| 8,958,955 B2 | 2/2015 | Hotary et al. |
| 9,145,078 B2 | 9/2015 | Locke et al. |
| 9,333,880 B2 * | 5/2016 | Farquhar .............. B60N 2/0244 |
| 9,896,002 B2 * | 2/2018 | Zouzal ................... B60N 2/995 |
| 10,059,232 B2 | 8/2018 | Frye et al. |
| 10,232,740 B1 * | 3/2019 | Jaradi ................... B60N 2/0232 |
| 2003/0090133 A1 | 5/2003 | Nathan et al. |
| 2011/0062737 A1 | 3/2011 | Kroener |
| 2014/0152041 A1 | 6/2014 | Woodhouse et al. |
| 2015/0084985 A1 | 3/2015 | Baudu |
| 2015/0145296 A1 | 5/2015 | Hotary et al. |
| 2015/0145300 A1 * | 5/2015 | Finlay ................ B64D 11/0696 297/257 |
| 2015/0166000 A1 * | 6/2015 | Honda .................... B60R 22/48 701/45 |
| 2016/0101710 A1 | 4/2016 | Bonk et al. |
| 2016/0280098 A1 * | 9/2016 | Frye ..................... B60N 2/0228 |
| 2016/0280161 A1 * | 9/2016 | Lippman ................ B60N 2/002 |
| 2016/0288669 A1 * | 10/2016 | Woodhouse ......... B60N 2/0252 |
| 2016/0332538 A1 | 11/2016 | Szawarski et al. |
| 2016/0332539 A1 | 11/2016 | Rawlinson et al. |

FOREIGN PATENT DOCUMENTS

| | | |
|---|---|---|
| CN | 106232421 A | 12/2016 |
| DE | 4409046 A1 | 9/1995 |
| DE | 19630223 C2 | 1/1998 |
| DE | 10312119 A1 | 10/2003 |
| DE | 102004038320 A1 | 3/2006 |
| DE | 102009043409 A1 | 4/2010 |
| DE | 102010062317 A1 | 6/2012 |
| DE | 102012208644 A1 | 5/2013 |
| DE | 102013012388 A1 | 1/2015 |
| DE | 102014209250 A1 | 4/2015 |
| DE | 202016103117 U1 | 6/2016 |
| DE | 102016105713 A1 | 9/2016 |
| DE | 10201614907 A1 | 10/2016 |
| FR | 2796342 B1 | 1/2001 |
| FR | 2988654 A1 | 10/2013 |

OTHER PUBLICATIONS

Office Action from Chinese Application No. CN 2019101102984; dated Apr. 8, 2021; 10 pages.

\* cited by examiner

SEAT ADJUSTMENT LIMITER AND METHOD OF CONTROL

TECHNICAL FIELD

The present disclosure relates to a system and method for positioning a vehicle seat.

BACKGROUND

Systems and methods exist for adjusting or otherwise moving a seat in a vehicle into a desired position. One example of such a system and method is disclosed in U.S. Patent Pub. No. US2017/0282753 by Lear Corporation.

SUMMARY

According to at least one embodiment, a vehicle seat controller is provided to control a front seat assembly and a rear seat assembly positioned directly behind of the front seat assembly. The vehicle seat controller programmed to receive a first input indicating whether the rear seat assembly is occupied and receive a second input indicating a position of the front seat assembly. The vehicle seat controller is programmed to provide a signal to an actuator to move the front seat assembly forward if the first input indicates the rear seat is occupied and the second input indicates the position exceeds a rearward travel threshold.

In another embodiment, the actuator moves the front seat assembly forward by at least one of decreasing a recline angle of a front seatback and moving forward a front seat bottom in a longitudinal direction.

In another embodiment, the vehicle seat controller is programmed to receive a change in the first input during driving to indicate the rear seat assembly is occupied. The vehicle seat controller is programmed to provide the signal to the actuator to move the front seat assembly forward while driving based on the change in the first input.

In another embodiment, the vehicle seat controller is programmed to receive a request to move the front seat assembly in a rearward direction. The vehicle seat controller is programmed to inhibit the request to move the front seat assembly in the rearward direction if the first input indicates the rear seat assembly is occupied and the second input indicates the position is at the rearward travel threshold.

In another embodiment, the vehicle seat controller is programmed to provide a warning if the request to move the front seat assembly moves the front seat assembly to the position at or exceeding the rearward travel threshold.

In another embodiment, the vehicle seat controller is programmed to receive a third input indicating whether the front seat assembly is occupied. The vehicle seat controller is programmed to provide a warning in advance of moving the front seat assembly forward if the third input indicates that the front seat assembly is occupied.

In another embodiment, a vehicle seating assembly is provided having a front seat assembly and a rear seat assembly directly behind the front seat assembly. The front seat assembly has a front seat bottom adapted to be mounted to a vehicle, and a front seatback adapted to be mounted adjacent to the front seat bottom. A motor is connected to at least one of the front seat bottom and front seatback to adjust a rearward position. A rear occupant sensor cooperates with the with the rear seat assembly to provide the first input. A vehicle seat controller is in communication with the sensor and the motor and is programmed to provide a signal to the motor to move the front seat assembly forward if the first input indicates the rear seat is occupied and the second input indicates the position exceeds a rearward travel threshold.

According to at least one other embodiment, a vehicle control system to control a front seat assembly and a rear seat assembly positioned directly behind of the front seat assembly is provided. A controller is programmed to move the front seat assembly forward when the rear seat assembly is occupied and a position of the front seat assembly exceeds a rear travel threshold. The controller is programmed to not move the front seat assembly forward when at least one of i) the rear seat assembly is not occupied; and ii) the front seat assembly does not exceed the rear travel threshold.

In another embodiment, the controller is programmed to continuously monitor whether the rear seat assembly is occupied during an ignition cycle.

In another embodiment, the controller is programmed to move the front seat assembly forward by at least one of decreasing a recline angle of a front seatback and moving a front seat bottom forward in a longitudinal direction.

In another embodiment, the rear travel threshold varies based on occupant data.

In another embodiment, the rear travel threshold has a fixed dimension being at least one of a maximum recline angle of the front seatback and a maximum longitudinal dimension of the front seat bottom.

In another embodiment, the controller is programmed to receive a request to move the front seat assembly in a rearward direction. The controller is programmed to inhibit the request to move the front seat assembly in the rearward direction if the rear seat assembly is occupied and the position is at the rear travel threshold.

In another embodiment, a vehicle seating assembly is provided having a front seat assembly and a rear seat assembly directly behind the front seat assembly.

According to at least one other embodiment, a method for controlling a seat assembly having a front seat and a rear seat positioned directly behind of the front seat is provided. A request to move a front seat in a rearward direction is received. The front seat is moved rearward if at least one of i) the rear seat is not occupied, and ii) a rearward position of the front seat is less than a rear travel threshold. Rearward movement of the front seat is inhibited if the rear seat is occupied and the rearward position of the front seat is at or exceeds the rear travel threshold.

In another embodiment, the method continuously monitors whether the rear seat is occupied during an ignition cycle.

In another embodiment, if the rearward position of the front seat exceeds the rear travel threshold at a beginning of the ignition cycle, the method moves the front seat forward if the rear seat is occupied.

In another embodiment, the method receives an opt-out input and allows rearward movement of the front seat if the rear seat is occupied and the rearward position of the front seat is at or exceeds the rear travel threshold based on the opt-out input.

In another embodiment, the method provides a warning that movement of the front seat is inhibited if the request to move the front seat in the reward direction moves the front seat to the rearward position that exceeds a reward travel threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
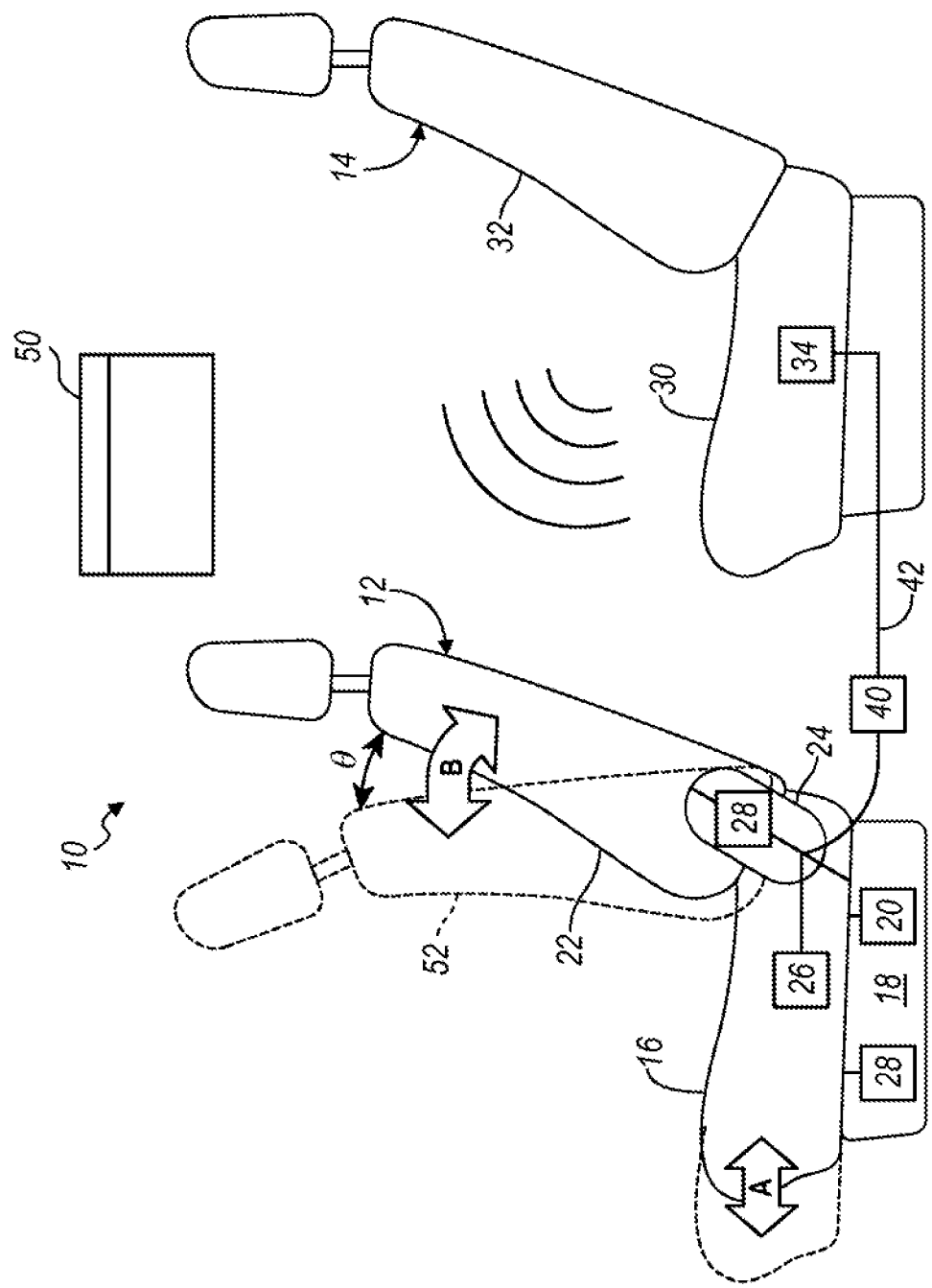
FIG. 1 is a schematic illustration of a vehicle seat assembly according to an embodiment, illustrated in an upright position and a stow position.

Referring now to FIG. 1, a vehicle seat assembly is illustrated according to an embodiment and is reference generally by numeral 10. The vehicle seat assembly 10 is adapted to be mounted to a vehicle body, as is known in the art. The vehicle seat assembly 10 may be installed in any vehicle, for example a land vehicle, such as an automobile. The vehicle seat assembly 10 includes a front seat 12 and a rear seat 14 positioned rearward of the front seat 12, both adapted to be mounted to a vehicle body. The forward and rear seats 12, 14 may be a driver's side seat or a passenger side seat.

The front row seat 12 includes a seat bottom 16 that is adapted to be adjustably mounted in the vehicle along a seating rail or frame 18. The front seat bottom 16 and frame 18 may include mounting hardware with fore/aft adjustment, as is known in the art. As such, the seat bottom 16 may be translated in the fore-aft direction A. An actuator 20 is provided for moving the seat bottom 16 in the fore-aft direction A.

The front seat 12 also includes a seatback 22 which is adapted to be pivotally connected to the vehicle body adjacent to the seat bottom 16, as is known in the art. The seatback 22 may be pivotally connected to the seat bottom 16 by a recline mechanism 24, which is also known in the art. Alternatively, the seatback 22 could be pivotally connected to the vehicle body via the recline mechanism 24. For example, the seatback 22 may be pivoted in the direction of arrow B. The seatback 22 is pivotally adjustable to at least two positions, an upright or reclined position depicted position, where the seatback 22 is pivoted rearward of the upright position at a reclined angle. Of course, the seatback 22 may be positioned in multiple reclined positions at various reclined angles rearward of the upright position based on the occupant's preferred seated position. The seatback 22 may also be pivoted forward of the upright position to a non-use position, or stowed position. An actuator 26 is provided for pivoting the seatback 22 to the various reclined angles $\theta$.

The front seat 12 may also be provided with sensors 28. The seat sensors 28 may indicate whether the front seat 12 is occupied, what its position is, or both. For example, the sensors 28 may be provided on the front seat bottom 16 for detecting the fore-aft or longitudinal position of the seat bottom 16. A sensor 28 can also be provided on the seatback 22 for detecting the reclined angle $\theta$ of the seatback 22.

The seating assembly 10 also includes the rear seat 14. During a rear impact it may be undesirable to have the front seat 12, positioned close to the seat directly behind it, such as the seat 14; therefore, embodiments described herein provide a system and method of positioning the front seat, or more particularly repositioning the front seat, to a more desirable position relative to the seat behind it. As shown in FIG. 1, the rear seat 14 is a second-row seat, but the seat assembly 10 may have any number of rows. The front seat 12 may be any seat forward of a rear seat 14. Embodiments described herein contemplate the use of systems and methods for any two seats disposed forward and rearward of each other—e.g., a second-row seat being a front seat relative to a third-row seat, and so on, and providing impact protecting from a direction behind the rearward seat. The rear seat 14 may not be directly behind the front seat 12 as used in relation to forward and rearward seats described herein and the seat assembly 10 is not limited to a rearward seat that is perfectly centered on the seat in front of it. Rather, the term also describes seats that may be somewhat offset from each other, such as in the case of a rearward center seat whose occupant may be partially exposed to rearward movement of a driver-side or passenger-side seat positioned in the row in front of it. Any position of a rearward seat relative to a seat in front of it may be considered "behind" or "rearward" for describing embodiments herein when an occupant in the rearward seat may be at least partially in-line with rearward movement of the seat in front of it. In another embodiment, the system and method contemplate the use of the seats are not facing the direction of travel while still providing impact from a direction reward of the rear seat. For example, the system and method may be used in a non-standard seating arrangement, such as in an autonomous vehicle, or other seating arrangement where the seats may be facing rearward and the system and method protects against a front impact when the vehicle is moving in the forward direction.

The rear seat 14 includes a seat bottom 30 adapted to be operably connected to a vehicle body for adjustment to between at least an upright and a stored position. The rear seat 14 also includes a seatback 32 operably connected to the vehicle body adjacent to the seat bottom 30.

The rear seat 14 may include a sensor 34 to detect whether the rear seat 14 is occupied. As used herein, a seat may be "occupied" by a person sitting on the rear seat 14; it may be occupied by an infant in a child carrier seat, a child sitting in a booster seat, or even by an object or objects occupying space relative to the seat cushion and seatback. In at least some embodiments, the system may proceed on an assumption that a seat such as the rear seat 14 is occupied.

A controller 40 may also be provided in the seat assembly 10, such as in the front seat 12. The controller 40 may be a memory module of the kind used to retain seat position preferences for the occupants, or it could be a dedicated controller. Alternatively, the controller 40 may be provided as a kernel in a vehicle controller. The controller 40 receives information from the vehicle communication bus about whether the rear seat 14 is occupied. This rear-occupant information may be provided from the sensor 34 located within the seat bottom 30 of the rear seat 14, from an onboard camera, or from a seat belt buckle sensor of the rear seat 14, or any suitable rear-occupant detection system. In addition to or instead of receiving inputs from sensors 28, 34 embedded within the seats 12, 14, the controller 40 may receive inputs from lasers, cameras, or other sensor systems that provide information regarding whether one or both of the seats 12, 14 is occupied.

The controller 40 is also in communication with the sensors 28, the seat bottom actuator 20, and the seatback actuator 26 in the front seat 12. The controller 40 will also receive information directly from the seat 12 regarding the seat recline angle $\theta$. This information will be used in a method for limiting the recline angle $\theta$ of the front seatback 22 as described in more detail below with reference to FIG.

2. The sensors 28, 34 and actuators 20, 26 are connected to a wire harness or communication bus 42 for conveying communication signals from the controller 40 and the front seat 12 or rear seat 14, or vice versa. The controller 40 may also receive additional information from the communication bus related to various vehicle conditions such as the status of an "opt-out" switch, the vehicle ignition, etc.

An interface 50 may also be provided with the seat assembly 10. The interface 50 may be integrated into the vehicle, such as an instrument display panel or audio system. The interface 50 may be remote, such as a personal digital assistant (PDA) including phones, tablets and the like. The interface 50 may be provided as a smart phone application, wherein users enter relevant information or physical characteristics about themselves. The smart phone interface may not require on-site expertise or seat properties. The remote interface permits a user to transport settings to each vehicle, such as personal passenger vehicles, airline seating, rental cars, and the like. The interface 50 may be wired or wireless communication with the controller 40.

Figure 2:
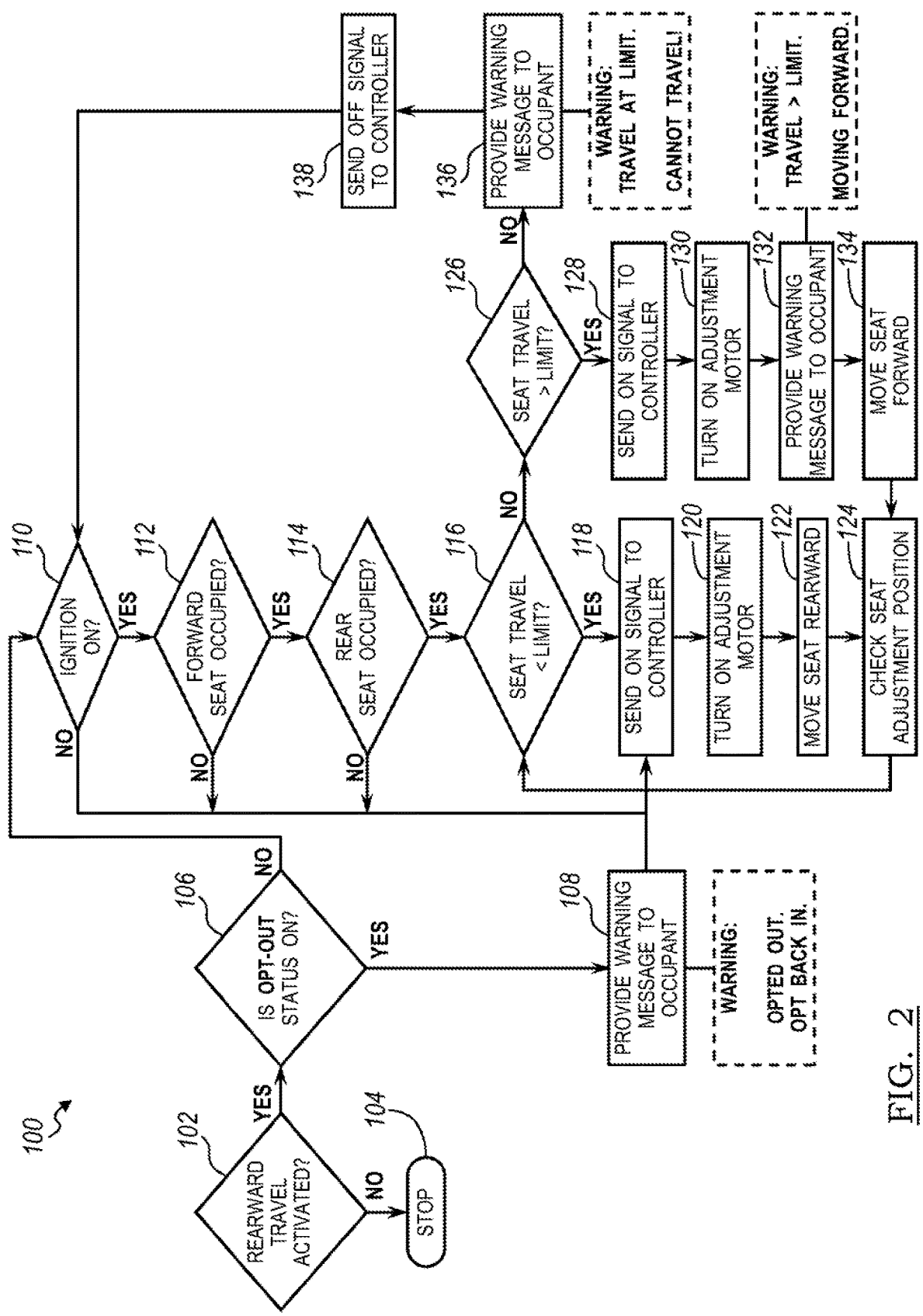
FIG. 2 is a flow chart illustration of a method of controlling the vehicle seat assembly of FIG. 1.

FIG. 2 shows a flowchart 100 illustrating a method of limiting adjustment of the front seat 12. As decision block 102, the control system determines whether rearward travel of the front seat 12 is activated. In other words, at this block, the control system and/or controller 40 determines whether the occupant of the front seat 12 is attempting to recline the front seatback 22 rearward in reclined direction B or move the front seat 12 rearward in the longitudinal direction A. If it is determined at block 102 that the rearward travel adjustment is not activated, the method stops at block 104.

If the rearward travel is activated, the method proceeds to block 106 to determine whether the "opt-out" status is "ON". The "opt-out" feature allows a vehicle occupant to disable the seat travel-adjustment limitation system. If the opt-out status is ON, at block 108 a warning message will be sent to the seated occupant indicating that the opt-out status is ON and recommending that the occupant opt-in for use of the seat travel-limitation system. The warning message may be provided to the occupant through a visual interface on the dashboard or audio warning, for example.

If it is determined at block 106 that the opt-out status is not ON, the method continues to decision block 110 where it is determined if the vehicle ignition is ON. If the vehicle ignition is ON, the method continues to decision block 112 where it is determined if the front seat 12 is occupied. If the front seat 12 is occupied, the method continues to decision block 114, where it is determined if the rear seat 14 behind the front seat 12 is also occupied. The controller continuously monitors whether the rear seat is occupied during an ignition cycle to determine if the rear seat is occupied and if the occupancy of the rear seat changes. For example, the vehicle may stop and pick up an occupant in the rear seat.

If the rear seat 14 is also occupied, it is determined at decision block 116 whether the reward travel is less than some predetermined threshold or predetermined limit. The predetermined limit is a rear travel threshold to prevent or reduce intrusion into the rear seat compartment to protect the rear seat occupant in a rear impact collision. In block 116, the controller may determine if the recline-angle θ in direction B of the front seatback 22 less than some predetermined limit. The current recline-angle θ of the seatback may be measured using a potentiometer, for example, or other position feedback devices. The controller may also determine if the rearward travel in a longitudinal direction A of the front seat 12 is at some predetermined limit. The predetermined limits may be a fixed dimension based on empirical procedures to determine the appropriate longitudinal dimension in the fore-aft direction A or the appropriate angle in the recline direction B to use as the predetermined limits. The predetermined limits may be set based on the size of the vehicle, the size of the vehicle interior, the size of the seats. In another embodiment, the predetermined limits may vary based on the occupant data, such as the size of occupant or the orientation of the occupant in the seat. For example, the predetermined limits may vary if the rear seat is occupied by an adult, or a child in a child seat, or if the child seat is front facing or rear facing. The occupant data may be obtained through inputs to the interface 50, or seat sensors 28, 34, for example.

If the rearward travel of the front seat 12 or front seatback 22 is less than the predetermined limit, the method proceeds to block 118, where an "ON" signal is sent to the controller 40, which, as described above, could be a memory module in the front seat 12. This same signal will be sent after the warning message is sent at block 108, or if any of the following occur: if it is determined at block 110 that the ignition is not ON, if it is determined at block 112 that the front seat 12 is not occupied, or if it is determined at block 114 that the rear seat 14 is not occupied.

After the "ON" signal has been sent to the controller 40 at block 118, the method proceeds to block 120 where the seat adjustment motor is turned on, or if the process is in a second or later iteration of blocks 118-124, then the adjustment motor is already running and it is kept on. The adjustment motor may be a recliner motor for adjusting the recline angle of the front seatback 22, or a for-aft motor for adjusting the longitudinal dimension for the front seat 12.

After the adjustment motor is turned on, the system allows the user front seat 12 rearward at block 122. At block 122, the front seatback 22 may be reclined rearward or the front seat 12 may be moved rearward in the longitudinal direction.

At block 124, the rearward travel is checked. The angle of recline may be checked and/or the fore-aft travel may be checked. From here the method loops back to the decision block at 116 to determine if the rearward travel of the front seat 12 and/or front seatback 22 is still less than the predetermined limit. If it is, blocks 118-124 will be repeated until the determination at decision block 116 is made that the rearward travel for the front seat and/or front seatback 22 is no longer less than the predetermined limit.

Once the rearward travel no longer less than the predetermined limit, the method moves to a decision block 126 where it is determined if the rearward travel is greater than the predetermined limit. For example, at block 126 the controller may determine if the angle of recline for the front seatback 22 is greater than the predetermined limit, or if the longitudinal dimension of the front seat 12 in the fore-aft direction A exceeds the predetermined limit.

If the rearward travel is greater than the predetermined limit, the method moves to block 128 where an "ON" signal is sent to the controller 40, just as in block 118. Next, the adjustment motor is turned on at block 130, just as it was in block 120. However, when the rearward travel is greater than the predetermined limit, a warning message at block 132 is provided to the occupant indicating that the recline-angle and/or longitudinal dimension is greater than the limit and that the front seat 12 will be moving forward. For example, the warning message may warn the forward occupant that the front seatback 22 will be automatically pivoting forward to reduce the rearward recline angle or that the front seat 12 is moving forward in the fore-aft direction A to reduce the rearward longitudinal dimension.

At block 134, the front seat 12 may be automatically moved forward. The front seatback 22 may be automatically pivoted forward and/or the front seat 12 may be automatically moved forward in the longitudinal direction A.

Block 124 is repeated and adjustment position of the front seat 12 and front seatback 22 is checked. As shown in the flowchart 100, these series of blocks may go through several iterations depending on the longitudinal position of the front seat 12 and the angle of recline of the front seatback 22.

Returning to decision block 116, if it is determined that the seat travel is not less than the predetermined limit, and then noting at block 126 it was also determined that the seat travel not greater than the predetermined limit, it follows that the seat travel is at the predetermined limit. In this situation, another warning message is provided to the occupant at block 136, indicating that the front seat 12 and/or seatback 22 has reached its limit and it cannot move rearward any further. After this, an "OFF" signal is sent to the controller 40 at block 138. Once stopped, the process may start over from block 102 when the seated occupant tries to activate any rearward travel of the front seat 12, including the rearward recline of the front seatback 22 or adjustment rearward in the longitudinal direction. Once stopped, the system and method may also give to the user the option to turn the system "off" or opt-out, such as at block 106, to continue allow the user to continue to adjust the forward seat in rearward direction.

Unless otherwise specifically defined herein, a seat is moved "forward" when it is moved in a forward direction relative to its own orientation. As shown in FIG. 1, the forward direction of the seats 12, 14 coincides with the forward direction of the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seating assembly comprising:
   a front seat assembly adapted to be mounted to a vehicle;
   a rear seat assembly directly behind the front seat assembly;
   a vehicle seat controller in electrical communication with and to control a front seat assembly and a rear seat assembly positioned directly behind of the front seat assembly, the vehicle seat controller programmed to:
   receive a user input indicating a request to move the front seat assembly in a rearward direction;
   receive a first input indicating whether the rear seat assembly is occupied;
   if the rear seat assembly is occupied, receive rear occupant data;
   receive a second input indicating a position of the front seat assembly;
   provide a signal to an actuator to move the front seat assembly forward if the first input indicates the rear seat assembly is occupied and the second input indicates the position exceeds a rearward travel threshold, wherein the rear travel threshold is based on the rear occupant; and
   inhibit the request to move the front seat assembly in the rearward direction if the first input indicates the rear seat assembly is occupied and the second input indicates the position is at the rearward travel threshold.

2. The vehicle seating assembly of claim 1, wherein the actuator moves the front seat assembly forward by at least one of decreasing a recline angle of a front seatback and moving forward a front seat bottom in a longitudinal direction.

3. The vehicle seating assembly of claim 1, wherein the controller is further programmed to:
   receive a change in the first input during driving to indicate the rear seat assembly is occupied; and
   provide the signal to the actuator to move the front seat assembly forward while driving based on the change in the first input.

4. The vehicle seating assembly of claim 1, wherein the controller is further programmed to:
   provide a warning if the request to move the front seat assembly moves the front seat assembly to the position at or exceeding the rearward travel threshold.

5. The vehicle seating assembly of claim 1, wherein the controller is further programmed to:
   receive a third input indicating whether the front seat assembly is occupied; and
   provide a warning in advance of moving the front seat assembly forward if the third input indicates that the front seat assembly is occupied.

6. The vehicle seating assembly of claim 1 further comprising:
   a motor connected to at least one of the front seat assembly to adjust the position; and
   a rear occupant sensor cooperating with the rear seat assembly to provide the first input.

7. A vehicle control system to control a front seat assembly and a rear seat assembly positioned directly behind of the front seat assembly, the control system comprising:
   a controller in electrical communication with the front seat assembly and rear seat assembly and programmed to:
   receive a user input indicating a request to move the front seat assembly in a rearward direction;
   move the front seat assembly forward when the rear seat assembly is occupied and a position of the front seat assembly exceeds a rear travel threshold; and
   not move the front seat assembly forward when at least one of i) the rear seat assembly is not occupied; and ii) the front seat assembly does not exceed the rear travel threshold.

8. The control system of claim 7 wherein the controller is programmed to continuously monitor whether the rear seat assembly is occupied during an ignition cycle.

9. The control system of claim 8, wherein if the front seat becomes occupied, the controller is programmed to move the front seat assembly forward by at least one of decreasing a recline angle of a front seatback and moving a front seat bottom forward in a longitudinal direction.

10. The control system of claim 9, wherein the controller is programmed to receive rear occupant data if the rear seat assembly is occupied, wherein the rear travel threshold varies based on occupant data.

11. The control system of claim 9 wherein the rear travel threshold comprises a fixed dimension being at least one of a maximum recline angle of the front seatback and a maximum longitudinal dimension of the front seat bottom.

12. The control system of claim 7, wherein the controller is further programmed to:
   receive a request to move the front seat assembly in a rearward direction; and inhibit the request to move the front seat assembly in the rearward direction if the rear seat assembly is occupied and the position is at the rear travel threshold.

13. The control system of claim 7 further comprising:

an actuator in communication with the controller and operatively connected to the front seat assembly to adjust a rearward position; and a rear occupant sensor in communication with the controller cooperating with the rear seat assembly to provide a signal indicating whether the rear seat assembly is occupied.

14. A method for controlling a seat assembly having a front seat and a rear seat positioned directly behind of the front seat, the method comprising:

receiving a user input indicating a request to move the front seat in a rearward direction;

if the rear seat is occupied, receiving rear occupant data;

moving the front seat rearward if of i) the rear seat is not occupied, and ii) a rearward position of the front seat is less than a rear travel threshold, wherein the rear travel threshold is based on the rear occupant; and inhibiting rearward movement of the front seat if the rear seat is occupied and the rearward position of the front seat is at or exceeds the rear travel threshold.

15. The method of claim 14 further comprising continuously monitoring whether the rear seat is occupied during an ignition cycle.

16. The method of claim 15 wherein further comprising if the rearward position of the front seat exceeds the rear travel threshold at a beginning of the ignition cycle, moving the front seat forward if the rear seat is occupied.

17. The method of claim 14 further comprising:

moving the front seat forward when the rear seat is occupied and the rearward position of the front seat exceeds the rear travel threshold.

18. The method of claim 17 further comprising:

receiving an opt-out input; and allowing rearward movement of the front seat if the rear seat is occupied and the rearward position of the front seat is at or exceeds the rear travel threshold based on the opt-out input.

19. The method of claim 14, further comprising:

providing a warning that movement of the front seat is inhibited if the request to move the front seat in the rearward direction moves the front seat to the rearward position that exceeds the rear travel threshold.

* * * * *